United States Patent
Stephens

[11] 3,918,907
[45] Nov. 11, 1975

[54] MICRO AUTOMATIC AMINO ACID ANALYSIS PROCESS AND SYSTEM

[75] Inventor: Donald E. Stephens, Palo Alto, Calif.

[73] Assignee: Beckman Instruments, Inc., Fullerton, Calif.

[22] Filed: Oct. 29, 1973

[21] Appl. No.: 410,541

[52] U.S. Cl. .......... 23/230 R; 23/230 M; 23/253 R; 73/61.1 C
[51] Int. Cl.² .............. G01N 31/08; G01N 31/20; G01N 31/22
[58] Field of Search ......... 23/230 R, 230 M, 253 R; 73/61.1 C

[56] References Cited
UNITED STATES PATENTS

| | | | |
|---|---|---|---|
| 3,236,367 | 2/1966 | Patterson | 210/251 X |
| 3,366,149 | 1/1968 | Taft et al. | 23/230 R X |
| 3,446,057 | 5/1969 | Bakalyar et al. | 73/61.1 C X |
| 3,472,627 | 10/1969 | Hrdina | 23/230 R |
| 3,536,450 | 10/1970 | Dus et al. | 73/61.1 C X |
| 3,551,110 | 12/1970 | Hrdina | 23/253 R |
| 3,694,160 | 9/1972 | Sagusa et al. | 23/230 R |
| 3,778,230 | 12/1973 | Arikawa et al. | 23/230 R X |

Primary Examiner—Morris O. Wolk
Assistant Examiner—Barry I. Hollander
Attorney, Agent, or Firm—R. J. Steinmeyer; F. L. Mehlhoff

[57] ABSTRACT

A colorimetric chromatograph for analysis of microsamples of amino acids with scaled down parts including a separation column and filters adapted for microsamples is arranged to prevent clogging of the filters and the column by spores from buffer solution or precipitate from ninhydrin reagent. Refrigeration of the buffer solution reduces the tendency of mold organisms to grow and produce particles which tend to plug the filters. A ninhydrin reagent is also refrigerated. Refrigeration of the ninhydrin reagent permits the use of ninhydrin reagent reduced by hydrindantin for analysis of microsamples. This form of ninhydrin reagent has a limited life at room temperature, but its use avoids the use of conventional reducing agents which tend to produce fine precipitates which plug scaled-down filters and columns employed in analysis of microsamples.

16 Claims, 3 Drawing Figures

MICRO AUTOMATIC AMINO ACID ANALYSIS PROCESS AND SYSTEM

BACKGROUND

In the automatic analysis of microsamples of amino acids, decreasing the sample size to be analyzed in ion exchange column chromatography introduces a number of problems caused by highly nonlinear scale-down effects. A reduction in cross section of the chromatography column by an order of magnitude, while utilizing the standard large column resin, does not give equivalent separation with a tenth size sample. Consequently, it is necessary to utilize a different resin which, among other differences, has a smaller average particle size and a smaller size distribution. This immediately leads to problems with the size of the support screens, the pore size of the polytetrafluoroethylene discs in filters, with column back pressure, and with the susceptibility of the column assembly to plugging with foreign particles such as mold spores. There are numerous other problems such as minimum practical sizes for tube bores, minimum drill hole sizes, practical minimum pump piston and valve sizes, etc. All of these contribute to the difficulties of simple scale-down of conventional systems. In some instances, the obvious devices used to overcome these problems have led to new problems which, in turn, must be overcome; these have necessitated devising a novel overall system for microsample chromatography. The tendency of standard reduction reagents to form fine precipitates has introduced particularly troublesome problems in connection with the scaling down of columns and filters.

It is accordingly an object of the invention to provide effective, practical, continuously operating methods and apparatus for microsample chromatography which avoid plugging and clogging of the scaled down elements of the chromatograph system.

A more specific object of the invention is to reduce the tendency of buffer solutions to develop molds or form spores.

Still another object of the invention is to permit the use of ninhydrin reagents having less tendency than conventional ninhydrin reagents to form fine precipitates.

Other and further objects, features and advantages of the invention will become apparent as the description proceeds.

SUMMARY OF THE INVENTION

In carrying out the invention in accordance with a preferred form thereof, elements in a small scale of microsample chromatography system are employed which correspond in function to the elements of a larger scale system normally utilized for ion exchange chromatographic analysis of conventional size samples. However, the parts are scaled down, the columns employ different resins suitable for microsamples, and modified filters are employed. In order to prevent clogging of the columns which have finer size resin particles requisite to microsample analysis, and finer filter sizes, the buffering solution is kept under refrigeration to retard the formation of mold. Dimethylsulfoxide is used as a solvent to permit hydrindantin to be added directly to the ninhydrin reagent. This system does not have the tendency of conventional ninhydrin reducing reagents to produce fine precipitates that will plug filters and columns designed for microsamples. To maintain the life of the ninhydrin reagent, degradation of the hydrindantin is kept to a minimum by refrigeration of the ninhydrin reagent.

The eluting buffers are stored under nitrogen pressure. Absorption of the pressurizing nitrogen takes place at the reduced temperature of the buffer solutions in the refrigerator; means are required to remove the nitrogen before the buffers enter the suction port of the metering pump. Nitrogen coming out of solution in the pump cavity will cause loss of eluent flow. Degassing is accomplished by passing the refrigerated buffers through a hot zone in which the dissolved nitrogen comes out of solution. The released nitrogen is captured in a series of bubble traps.

The refrigerated ninhydrin solution is too viscous for proper mixing with the buffered sample in a conventional mixing manifold. The ninhydrin must be warmed without subjecting it or the mixing manifold for long periods of time to the elevated temperature (100°C) of the conventional reaction coil. These high temperatures would tend to polymerize and thicken the ninhydrin in the line to the reaction coil; means are also provided for warming the mixing manifold. The prewarmer elevates the ninhydrin stream to a temperature sufficiently below that of the reaction coil so as to preclude polymerization. However, the heat for the prewarmer is derived from the reaction coil bath by utilization of a thermal conduction rod, the lower end of which is immersed in the reaction bath. The upper end has the mixing manifold and a coil of tubing in the ninhydrin line in thermal contact with the upper end of the conduction rod.

A better understanding of the invention will be afforded by the following detailed description considered in conjunction with the accompanying drawing.

DRAWINGS

FIG. 1 of the drawings is a schematic diagram illustrating an embodiment of the invention, FIG. 2 is a view of a warming arrangement for the ninhydrin line and the mixing manifold showing a reaction coil heater in fragmentary form in section, and FIG. 3 is a fragmentary top view of the manifold of FIG. 2.

Like reference characters are utilized throughout the drawings to designate like parts.

DETAILED DESCRIPTION

Figure 1:
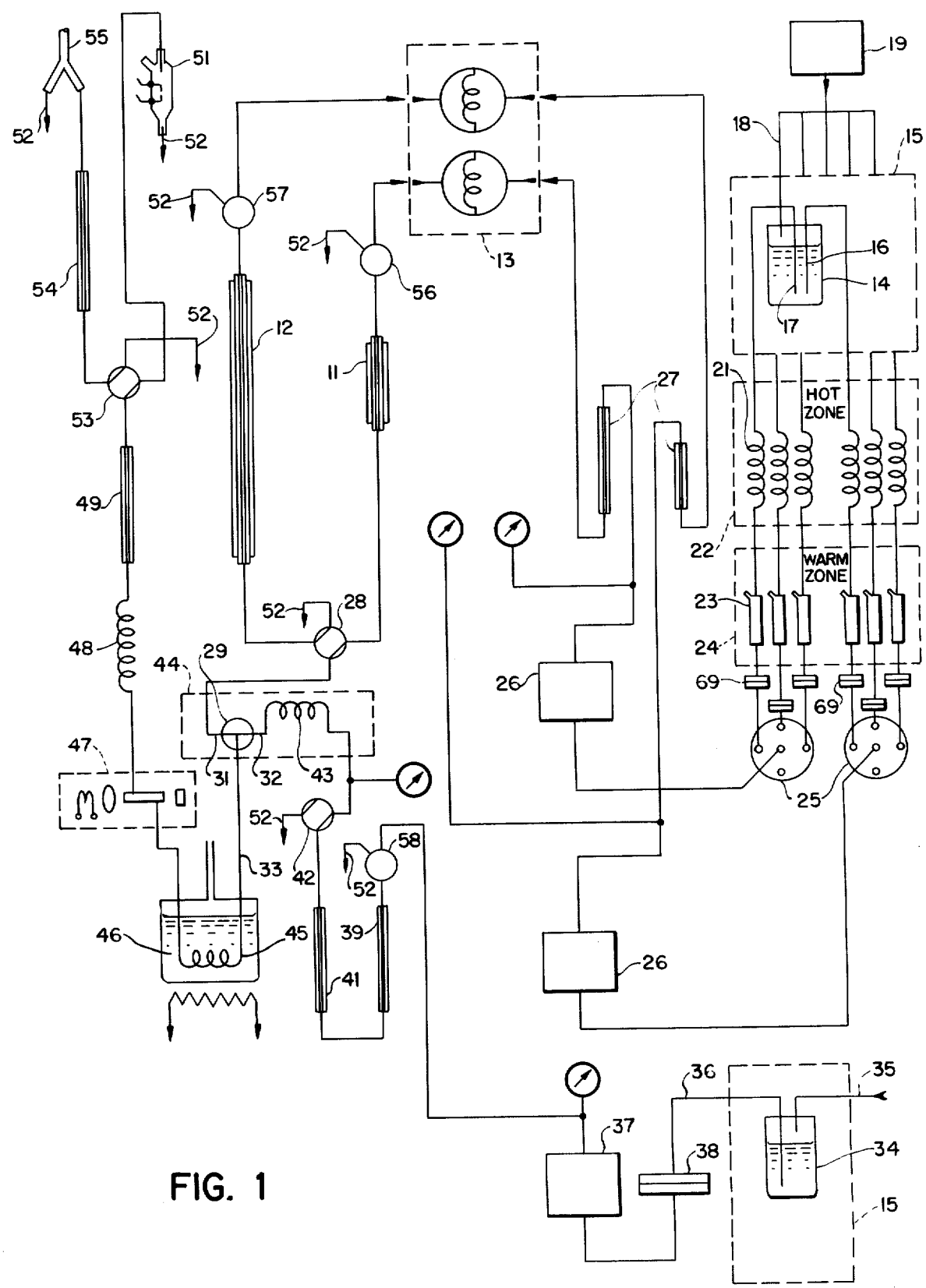

The invention relates to improvements in a general type of amino acid analysis system, such as described in FIG. 1 of U.S. Pat. No. 3,236,367 Patterson, assigned to Beckman Instruments, Inc., the assignee of the present invention, to enable microsamples to be analyzed. For the sake of illustration, a preferred embodiment of the invention is described employing alternate flow paths to enable separation of one sample in one chromatograph separation column to take place while another chromatograph column is being regenerated.

As represented in the flow diagram of FIG. 1, there is a short chromatographic separation column 11 and a long separation column 12 which are temperature controlled by means not shown. An automatic sample injector 13 is provided to introduce samples onto the chromatography columns 11 and 12. The injector adds each sample segmentally to the buffer stream at the outset of each analysis. The buffer is supplied from one of a plurality of nitrogen pressurized refrigerated reservoirs of buffer solutions. Only one such buffer reservoir 14 is shown in the drawing. Refrigerator 15 is provided for maintaining the temperature of the buffer solution at approximately 7°C. The buffers are metered at high pressure (up to 1000 psig.) onto the column by a reciprocating metering pump 26. As indicated schematically, the buffer solution bottles 14 are closed containers with tubes 16 and 17 dipping into the buffer solution for connection in alternate output lines to the pumps 26 serving columns 11 and 12, respectively and with a tube 18 entering the top of the container 14 and connected to a source of inert gas under low pressure such as a nitrogen tank 19. The tank 19 supplies nitrogen at three pounds per square inch gauge, to maintain a positive head pressure on the buffers at the inlet of metering pumps 26. This is mandatory to prevent cavitation in the pumps during the intake of the metering stroke.

In order to remove any nitrogen dissolved in the buffers, suitable de-gassers are provided. These may take the form of de-gassing coils 21 enclosed in a heater 22 and bubble traps 23 enclosed in a compartment 24, maintaining the warmth of the flowing liquid at a temperature below that of the heater 22. The temperature may, for example, be maintained at 100°C in the heater 22 and at 35°C in the warm zone 24.

Automated valves 25 actuated by a programmer, not shown, select which buffer reservoir is to be connected to the column pumps 26. It is essential that the pulsating output of metering pumps 26 be damped out prior to reaching analytical columns 11 and 12. The resilient characteristics of column packing resins are utilized to do this by including two pre-columns 27 ahead of the sample injector 13. These columns reduce pulsations to an acceptable level. A program-controlled motorized selector valve 28 directs the effluent of analytical columns 11 and 12 to an output line where a mixing manifold 29 is provided having an input 31 from the selector valve 28, a ninhydrin input 32 and an output line 33.

Ninhydrin reservoir 34, containing dimethyl sulfoxide solvent and excess added hydrindantin, is mounted in refrigerator 15 and is maintained at a temperature of 7°C. An inert atmosphere is maintained in the ninhydrin reservoir 34 by having an input line 35 connected to a source of inert gas such as nitrogen regulated to three pounds per square inch gauge. Output line 36 is connected to the inlet port of metering pump 37 through filter 38.

The output of metering pump 37 is connected through a manual diverter valve 58 to a resin packed column 39, the purpose of which is to smooth the pulsating output of pump 37. The smoothed output of column 39 is directed through rotameter 41 and selector valve 42 to a preheating coil 43. Passing through coil 43, the temperature of the ninhydrin is raised to approximately 50°C before it blends with the analytical column effluent in mixing manifold 29. Coil 43 forms a fluid conveying passageway mounted in or on a suitable warming device 44, represented schematically in FIG. 1. An example of a preheater utilizing the coil 43 is shown in greater detail in FIG. 2.

Conventional means may be provided for heating the outflow from the mixing manifold line 33 to the requisite temperature for developing the color of the ninhydrin and column eluent mixture. This may take the form of a reaction coil 45 in an electrically heated boiling liquid bath 46.

The system also includes a photometer 47, a back-pressure coil 48, rotameter 49 and a flow detector 51 having an output 52 to waste. In order to enable the rotameter 49 to be calibrated, a flow pipette valve 53 may also be interposed in the line with a connection to a flow pipette 54 and a syphon break 55. For facilitating column packing, bleed valves 56 and 57 are provided in the input lines to the columns 11 and 12, respectively, as well as bleed valve 58 in the ninhydrin line.

Figures 2, 3:
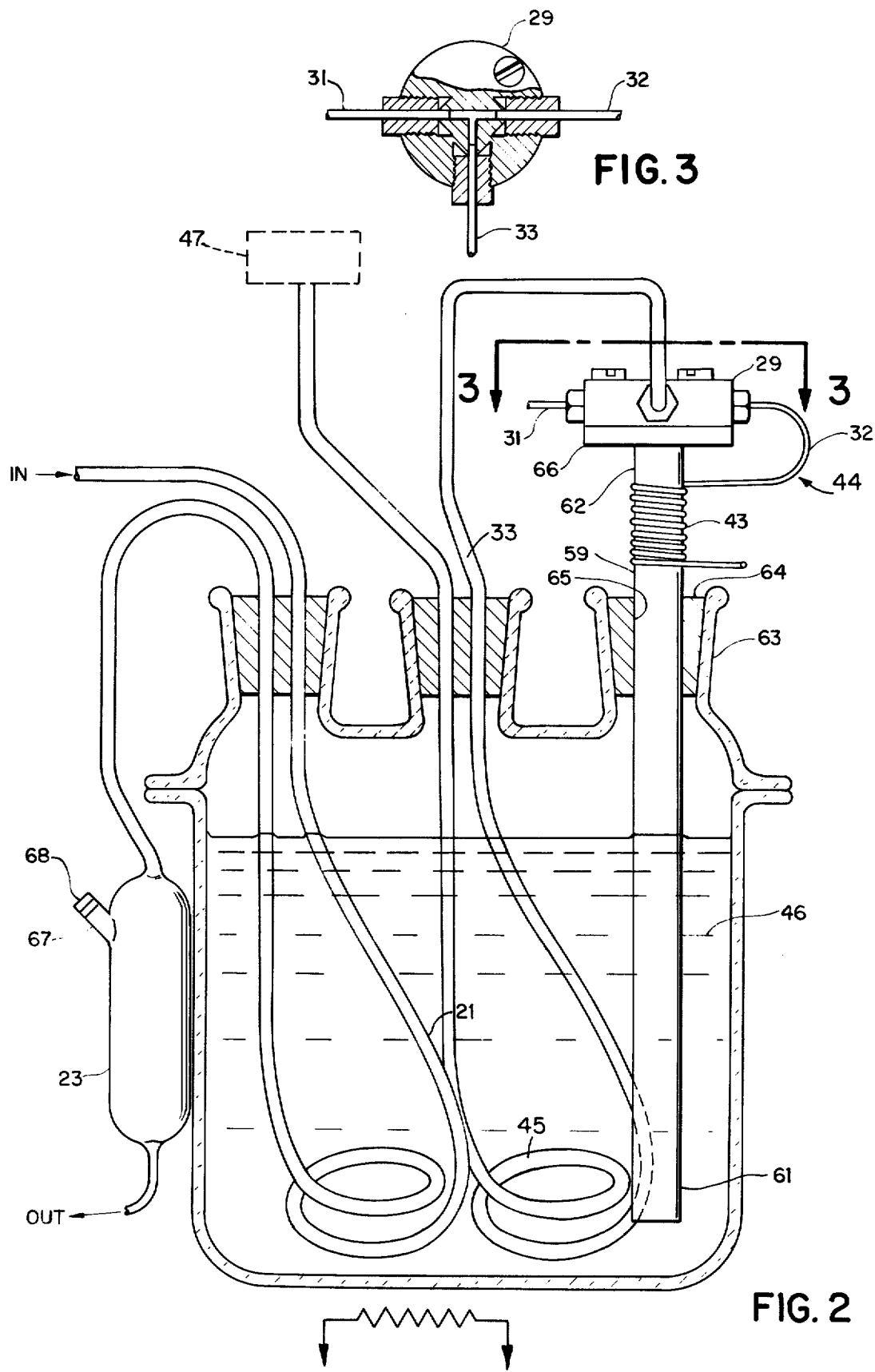

As illustrated in FIG. 2, the ninhydrin preheater may take the form of a conduction rod 59 composed of a metal such as stainless steel having a low coefficient of thermal conductivity with lower end 61 dipping into the boiling liquid bath 46 for the reaction coil 45 and with an upper end 62 wrapped by the coil of tubing 43 constituting the preheating coil. In order to facilitate the mixing of ninhydrin with the buffered stream or column eluent in the mixing manifold 29, the mixing manifold 29 is also preheated. This may be accomplished by mounting it on a thermal conductivity plate 66 at the upper end of the conduction rod 59, or by forming the passages of the manifold within conduction rod 59 itself.

As shown in FIG. 2 the container for the reaction coil boiling liquid 46 is a closed container having a neck 63 closed by a stopper 64 having an opening 65 which is in turn closed by insertion therein of the ninhydrin preheater conduction rod 59. The same heat source may be employed for providing the hot zone for the de-gassing coils 21. For example, as illustrated in FIG. 2, the de-gassing coils 21 (only one of which is shown in FIG. 2) are immersed within the boiling liquid 46. The warming for the bubbling traps 23 may also be provided by the same source by mounting traps 23 in thermal contact with the exterior of the container for the reaction coil 45 and the boiling liquid 46. Bubble traps 23 comprise cylindrical vessels with liquid inlet at the top, outlet at the bottom. A side arm 67, filled with stopper 68, permits accumulated gas to be bled off as required. As shown in FIG. 1, Teflon disc filters 69 are interposed in the lines between the bubble traps 23 and the valves 25.

OPERATION

It should be understood that the motorized effluent valve 28 is programmed as in conventional equipment to select the column effluent for passage through the reaction and colorimeter system at a time appropriate to the arrival of the resolved segments of amino acids at the outlet of the column. During column regeneration and during the early part of the separation of the long column 12, the effluent is directed to drain. Through careful programming, the long column 12 may be regenerated while the fluid from the short column 11 is being color-reacted. The overall system and methodology may be modified to suit the requirements of a particular investigation, but for successful operation as a micro-system, various novel features are preferably employed, such as the pressurized and refrigerated buffer reservoirs, pulsation damping columns, stream filters, buffer de-gassing means, and the ninhydrin preheater.

As in conventional systems, buffer solution flows in one or the other of the buffer output lines, as determined by the motorized selector valves 25, into one of the metering pumps 26 for either column 11 or 12. Thence, as determined by the setting of the motorized selector valve 28, the separated column eluent or buffered stream flows to the input 31 of the mixing manifold 29. Simultaneously, ninhydrin reagent flows to the input 32 of the mixing manifold 29. From the output line 33 of the mixing manifold 29, the mixture of ninhydrin and column eluent or buffered sample flows through the heated reaction coil 45 (to develop the color of the sample), thence into the photometer 47 to produce a conventional output curve representative of the amino acids present in the successive segments of the column, and out through the rotameter 49, the flow detector 51 and waste 52.

Since the chromatography columns 11 and 12 are of reduced size for handling microsamples, the resin employed therein has a smaller average particle size and a smaller sized distribution.

Filter 38 contains polytetrafluoroethylene discs of small pore size. The pre-columns 27 also are subject to plugging if particles become clogged therein.

Refrigeration of the buffer solutions in reservoirs 14 during storage thereof retards the growth of molds and the formation of mold spores. Thus, clogging difficulties in the precolumns 27 and analytical columns 11 and 12 are subsequently minimized, as well as possible problems from the plugging of smaller tube bores for use in lines carrying microsamples.

Refrigeration of the buffer solutions results in increased solubility of nitrogen in the cooled solutions. Owing to the very low flow rates (10ml/hr) the solutions have time to approach room temperature before reaching the metering pumps 26. Under these conditions the nitrogen will leave solution and form bubbles in the pump inlets. This effectively starves the metering pumps, rendering the instrument inoperative. Merely placing bubble traps immediately ahead of the inlets to the pumps 26 will not overcome the problem because the solutions are still saturated with nitrogen at ambient pressure and temperature. During the pump intake stroke, the pressure is reduced and the gas will come out of solution. However, in the system illustrated, the buffer is withdrawn from refrigerated containers 15 through the de-gassing coils 21 followed by the bubble traps 23, coils 21 being heated to a higher temperature than traps 23.

Since the bubble traps 23 are above pump inlet temperature, there is no possibility that the nitrogen in a bubble trap will resaturate the buffer for the conditions at the pump inlet. The bubble traps are made of sufficient size to collect all of the nitrogen released from the buffer in the course of an operating period of at least 72 hours. At intervals as required, the operator may open the bubble trap side arms to release the collected gas. In laboratories where excessive mold growth is a problem, smaller traps could be employed, requiring more frequent purging.

Owing to the smaller tubing bores, the finer pore sizes and the use of filters and columns which have finer particles therein, the presence of fine precipitates such as normally occurs from conventional ninhydrin reduction reagents will plug filters and columns. Accordingly, the ninhydrin reagent previously described is employed which has no tendency to produce precipitates. Ninhydrin reagents which employ hydrindantin to insure stochiometric calibration of the color development reaction do not have the stability inherent in reducers of the metal salt type. Undesirable degradation of the reagent used in this system is retarded by the use of the refrigerator 15. The low temperature greatly increases the viscosity of the ninhydrin reagent which would lead to inefficient mixing in the mixing manifold. This is avoided in the arrangement illustrated in accordance with the invention. The mixing manifold 29 and the preheat coil 43 are warmed to maintain the viscosity of the ninhydrin reagent at the desired value as it enters the mixing tube 29.

A secondary benefit is derived from pre-heating the ninhydrin reagent, as follows:

Color development of the ninhydrin/amino acid solution is a stochiometric process that is dependent upon reaction temperature and the dwell time of the mixture within the reactor; i.e., within limits, at a given temperature (100°C) the intensity of color development will vary directly with time of reaction. The dwell time can be extended by increasing the length of reaction coil 45. However, all flow connections downstream of the analyzing columns 11 and 12 tend to diffuse the separated samples within the process stream. This reduces the analytical resolution of the instrument. The best resolution is maintained by keeping the reaction coil as short as possible. This means that increased resolution must be gained at the loss of color development, or more directly, analytical sensitivity. Pre-heating the ninhydrin immediately prior to the mixing manifold 29 effectively increases the temperature-time value of this color development reaction. It provides increased color development at shorter reaction coil lengths.

Since the preheat coil 43 and the mixing manifold 29 are maintained at a moderately elevated temperature below that of the reaction coil 45 and the boiling liquid bath 46, a polymerization reaction is avoided which will occur if the preheat coil 43 and the mixing manifold 29 were within the container for the boiling liquid 46. However, with the arrangement illustrated, increase in viscosity of the ninhydrin under non-flow conditions, as for example with the instrument shut down and on standby for the night, does not occur.

As better observed from the arrangement of FIG. 2, the conduction rod 59 transfers sufficient heat to the preheat coil 43 and the mixing manifold 29 to overcome high viscosity without causing polymerization. The stainless steel rod has relatively low thermal conductivity. The rod 59 is adapted to be inserted further into the stopper 61 or withdrawn therefrom, thus having an adjustable depth of engagement in the liquid 46 which provides for adjustment of the temperature maintained in the ninhydrin reagent at the mixing point. The required temperature range is maintained over moderately large changes in ambient temperature.

While a particular form of the invention has been fully illustrated and described, it will be obvious to those skilled in the art that various modifications and alterations may be made therein and it is intended to cover all such modifications and alterations as may fall within the spirit and scope of the invention.

I claim:

1. A chromatograph analysis system for minute samples comprising in combination:

a separation column having an output end;

a buffer solution reservoir;

means for refrigerating said buffer solution reservoir to minimize the tendency for mold organisms to grow and produce particles which might plug the analysis system;

inert gas means connected to said buffer solution reservoir for pressurizing buffer solution held therein;

means for combining a sample and buffer solution from said reservoir and passing them through said separation column;

heater means interposed between said buffer solution reservoir and said separation column to drive off inert gas dissolved in said buffer solution due to refrigeration thereof;

a ninhydrin reagent reservoir;

means for delivering ninhydrin reagent from said ninhydrin reservoir and combining said reagent with the buffered sample effluent from said column; and means for colorimetrically analyzing the combined flow of buffered sample effluent and ninhydrin reagent.

2. The analysis system defined in claim 1 wherein a filter means is interposed between the buffer solution reservoir and said separation column and said heater means is interposed between said buffer solution reservoir and said filter means.

3. The system defined in claim 1 in which means are provided for refrigerating said ninhydrin reservoir and heating means are provided between said ninhydrin reservoir and the means for combining the ninhydrin and buffered sample thereby decreasing the viscosity of the ninhydrin.

4. In a system for the analysis of microsamples of amino acids including a chromatograph column, at least one buffer solution reservoir, conduit means connected between said buffer solution reservoir and said chromatograph column for delivering buffer solution to said column, a sample injector means in said conduit means for introducing a sample of amino acids into said buffer solution flowing to said column, a metering pump in said conduit means for delivering buffer solution and sample to said column, a ninhydrin reagent reservoir and conduit means for conducting ninhydrin reagent from said reservoir and mixing said ninhydrin reagent with the effluent flowing from said chromatograph column, and means for analyzing the characteristic colorization of ninhydrin and amino acid reaction products, the improvement which comprises:

a source of pressurized inert gas connected to said buffer solution reservoir for maintaining said buffer solution under pressure;

refrigeration means for maintaining said buffer solution and said ninhydrin solution reagent reservoirs at a predetermined temperature below ambient;

a heater means interposed in the conduit from said buffer solution reservoir for de-gassing the buffer solution; and a bubble trap interposed after said heater means for eliminating pressurizing gas from the buffer solution flowing through said conduit means to said metering pump.

5. The improvement as defined in claim 4 including a refrigerated ninhydrin container and a line for supplying ninhydrin to the eluted sample, refrigeration of the ninhydrin container serving to improve the stability of the ninhydrin reagent.

6. In a system for analyzing microsamples of resolved amino acids including a line for delivering an eluted sample stream, a ninhydrin reservoir, a ninhydrin line for delivering ninhydrin from said reservoir to the eluted sample stream, mixing means connected to said lines for receiving both streams, a reaction coil connected to the mixing means to act on both streams, and heating means for the reaction coil to develop the coloration of the mixed ninhydrin and amino acids of the sample, the improvement comprising:

a refrigerator means in which said ninhydrin reservoir is stored, said ninhydrin line extending outside the refrigerator means to the mixing means;

prewarming means for said ninhydrin in the form of a heatconducting rod having one end heated by the reaction coil heating means and having the other end in heat-transfer relationship with a fluid-conveying passageway means, said fluid-conveying passageway means being connected to said ninhydrin line for heating ninhydrin flowing therethrough.

7. The system defined in claim 6 wherein the heating means for said reaction coil is a boiling liquid bath and the lower end of said heat-conducting rod is immersed in said boiling liquid bath, said rod conducting heat from said boiling liquid bath to said ninhydrin flowing through said passageway means in heat-transfer relationship with the upper end of said rod.

8. The system defined in claim 6 in which said fluid-conveying passageway comprises a coil of tubing wrapped around the upper end of said rod, said coil forming a portion of said ninhydrin line for delivering ninhydrin to said mixing means.

9. The improvement defined in claim 7 wherein the mixing means comprises a mixing T in heat receiving contact with the upper end of the conduction rod.

10. In a chromatograph column system of analysis having a buffer solution container pressurized with an inert gas and connected by a conduit to the chromatograph column for delivering buffer solution to the column and means for colorimetrically analyzing effluent flowing from the column including a reaction coil through which the effluent is directed and heating means for heating said reaction coil, the improvement comprising:

a refrigerating means in which the buffer solution container is mounted;

a de-gassing coil of tubing connected in said conduit from said buffer solution container to said chromatograph column, said de-gassing coil being in heat-transfer contact with said heating means for heating said reaction coil thereby driving off gas absorbed in said buffer solution; and a bubble trap through which said buffer solution flows after being heated in said de-gassing coil thereby permitting gas bubbles in said buffer solution to escape.

11. The chromatograph column system of analysis defined in claim 10 in which said means for heating said reaction coil includes a hot zone and a warm zone and said de-gassing coil is in contact with said hot zone of said heating means and said bubble trap is in contact with said warm zone of said heating means.

12. In the method of analyzing microsamples of amino acids which comprises the steps of:

supplying a buffer solution, pressurizing the buffer solution with inert gas and forming a buffer stream, metering the buffer stream, injecting a microsample into the metered buffer stream, delivering the metered buffer stream and microsample onto a separating column containing fine particle resins, mixing the stream from the column with a ninhydrin reagent and exposing the mixture to a source of heat for reaction to bring out color characteristic of amino acids, the improvement which comprises refrigerating the buffer solution before it enters the buffer stream, thereafter de-gassing the buffer stream before metering and injection of the sample into the buffer stream.

13. The improvement defined in claim 12 wherein: the buffer stream, before injection of the sample, is exposed to the reaction source of heat for purposes of de-gassing, and then conducted into a zone of lower temperature but higher than ambient.

14. The improvement defined in claim 12 including the additional steps of maintaining the ninhydrin reagent refrigerated and warming the refrigerated ninhydrin reagent prior to mixing it with the buffered stream.

15. The improvement defined in claim 12 wherein the buffered stream and ninhydrin reagent are both warmed during mixing.

16. The improvement defined in claim 14 which further comprises dissolving ninhydrin in dimethyl sulfoxide with an excess of hydrindantin added to form the ninhydrin reagent.

* * * * *